(12) United States Patent
Komuro et al.

(10) Patent No.: US 12,060,926 B2
(45) Date of Patent: Aug. 13, 2024

(54) BALL SCREW, METHOD FOR MANUFACTURING BALL SCREW, POWER STEERING DEVICE, AND METHOD FOR MANUFACTURING POWER STEERING DEVICE

(71) Applicant: Hitachi Astemo, Ltd., Hitachinaka (JP)

(72) Inventors: Matahiro Komuro, Tokyo (JP); Hisamitsu Hatou, Tokyo (JP); Kotaro Shiino, Hitachinaka (JP); Koji Numakura, Hitachinaka (JP); Shintaro Tsujimi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 507 days.

(21) Appl. No.: 17/434,915

(22) PCT Filed: Mar. 3, 2020

(86) PCT No.: PCT/JP2020/008825
§ 371 (c)(1),
(2) Date: Aug. 30, 2021

(87) PCT Pub. No.: WO2020/189253
PCT Pub. Date: Sep. 24, 2020

(65) Prior Publication Data
US 2022/0128135 A1     Apr. 28, 2022

(30) Foreign Application Priority Data

Mar. 15, 2019 (JP) ................. 2019-047918

(51) Int. Cl.
| | | |
|---|---|---|
| *C21D 1/10* | (2006.01) | |
| *F16H 25/22* | (2006.01) | |
| *F16H 25/24* | (2006.01) | |
| *B62D 5/04* | (2006.01) | |

(52) U.S. Cl.
CPC ............... *F16H 25/22* (2013.01); *C21D 1/10* (2013.01); *F16H 25/24* (2013.01); *B62D 5/04* (2013.01)

(58) Field of Classification Search
CPC .......... F16H 25/22; F16H 25/24; C21D 1/10; B62D 5/04
See application file for complete search history.

(56) References Cited

FOREIGN PATENT DOCUMENTS

| | | |
|---|---|---|
| JP | 2000-129418 A | 5/2000 |
| JP | 2007-239068 A | 9/2007 |
| JP | 2009-138777 A | 6/2009 |
| JP | 2017-083020 A | 5/2017 |
| JP | 2018-035912 A | 3/2018 |

OTHER PUBLICATIONS

International Search Report with English translation and Written Opinion issued in corresponding application No. PCT/JP2020/008825 dated Apr. 28, 2020.

*Primary Examiner* — Jessee R Roe
(74) *Attorney, Agent, or Firm* — Foley & Lardner LLP (57) ABSTRACT

An object of the present invention is to provide a ball screw having a structure in which a screw shaft and a nut satisfy required performance and having improved durability, a method for manufacturing the ball screw, a power steering device, and a method for manufacturing the power steering device.

A ball screw according to the present invention includes: a nut made of a steel substrate having an inner peripheral surface on which a female screw is formed; a screw shaft that is combined with the nut and is made of a steel substrate having an outer peripheral surface on which a male screw facing the female screw is formed; and a plurality of balls arranged between the female screw and the male screw. A surface of the nut in contact with the ball and a surface of the screw shaft in contact with the ball each have carburized layers. A carbon concentration in the carburized layer of the nut is higher than a carbon concentration in the carburized layer of the screw shaft.

10 Claims, 9 Drawing Sheets

BALL SCREW, METHOD FOR MANUFACTURING BALL SCREW, POWER STEERING DEVICE, AND METHOD FOR MANUFACTURING POWER STEERING DEVICE

TECHNICAL FIELD

The present invention relates to a ball screw, a method for manufacturing the ball screw, a power steering device, and a method for manufacturing the power steering device.

BACKGROUND ART

It is known that a fatigue damage called pitching or flaking may occur on a surface of a sliding member, such as a bearing, a ball screw, a chain, a cam, a gear, and a spline, as the sliding member slides. Since these fatigue damages reduce the life of the sliding member, various methods for improving fatigue strength of a sliding portion have been proposed. Further, the improvement of the fatigue strength of the sliding portion also has an advantage that a component can be reduced in size and cost.

PTL 1 discloses a method for manufacturing a rolling screw device used when manufacturing the rolling screw device which includes: a screw shaft having an outer peripheral surface on which a spirally continuous screw groove is formed; a cylindrical nut having an inner peripheral surface on which a screw groove facing the screw groove of the screw shaft is formed; and a plurality of rolling elements which are arranged to be capable of rolling between the screw grooves, the screw shaft and the nut performing relatively linear movements in an axial direction via rolling of the rolling elements by relative rotational movements of the screw shaft and the nut. The method includes molding steel materials into predetermined shapes and performing a heat treatment to obtain the screw shaft and the nut such that the amount of carbon contained in the steel material used for the nut is larger than the amount of carbon contained in the steel material used for the screw shaft. A carburization treatment (carburizing and quenching) is performed as the heat treatment to form a surface hardened layer on each of the screw shaft and the nut.

CITATION LIST

Patent Literature

PTL 1: JP 2009-138777 A

SUMMARY OF INVENTION

Technical Problem

Due to a configuration of a ball screw, a portion receiving a load in a screw shaft also moves along with a stroke of the screw shaft, but a portion receiving a load in a nut does not move. Therefore, the nut needs to have a surface hardness higher than that of the screw shaft in order to improve the durability of the ball screw. In other words, the screw shaft does not need to be as hard as the nut. Meanwhile, the screw shaft receives a torsional load or a bending load, and thus, the screw shaft needs to have higher strength against these loads than the nut.

Manufacturing methods should be also studied such that each of the nut and the screw shaft satisfies the above-described required performance, and a process is as simple as possible and does not require too much cost. In this regard, there is room for further improvement in conventional ball screws and methods for manufacturing the same.

An object of the present invention is to provide a ball screw having a structure in which a screw shaft and a nut satisfy required performance and having improved durability, a method for manufacturing the ball screw, a power steering device, and a method for manufacturing the power steering device.

Solution to Problem

A first aspect of the present invention to solve the above problems is a ball screw including: a nut made of a steel substrate having an inner peripheral surface on which a female screw is formed; a screw shaft that is combined with the nut and is made of a steel substrate having an outer peripheral surface on which a male screw facing the female screw is formed; and a plurality of balls arranged between the female screw and the male screw. A surface of the nut in contact with the ball and a surface of the screw shaft in contact with the ball each have carburized layers. A carbon concentration in the carburized layer of the nut is higher than a carbon concentration in the carburized layer of the screw shaft.

A second aspect of the present invention is a method for manufacturing a ball screw which includes: a nut made of a steel substrate having an inner peripheral surface on which a female screw is formed; a screw shaft that is combined with the nut and is made of a steel substrate having an outer peripheral surface on which a male screw facing the female screw is formed; and a plurality of balls arranged between the female screw and the male screw. The method includes: performing a radio frequency carburization treatment of heating a surface of the screw shaft in contact with the ball in a carburizing gas atmosphere while applying a radio frequency to form a carburized layer; and performing an induction hardening treatment of heating the screw shaft subjected to a radio frequency heating treatment while applying a radio frequency to the screw shaft to quench the screw shaft.

A more specific configuration of the present invention is described in the claims.

Advantageous Effects of Invention

According to the present invention, it is possible to provide the ball screw having the structure in which the screw shaft and the nut satisfy required performance, the method for manufacturing the ball screw, a the steering device, and the method for manufacturing the power steering device.

Other objects, configurations, and effects which have not been described above will become apparent from an embodiment to be described hereinafter.

DESCRIPTION OF EMBODIMENTS

In the present invention, in order to satisfy the above-described required performance of each of a nut and a screw shaft, the nut is subjected to a normal carburization treatment, and the screw shaft is subjected to a carburization treatment at a radio frequency. With such processing, a rack can obtain a hardness equivalent to that of the nut in short-time processing.

Hereinafter, an embodiment of the present invention will be described with reference to the drawings. However, the present invention is not limited to the embodiment described herein, and can be appropriately combined and improved within a scope that does not change a gist of the invention.
[Ball Screw and Power Steering Device]

Figure 1:
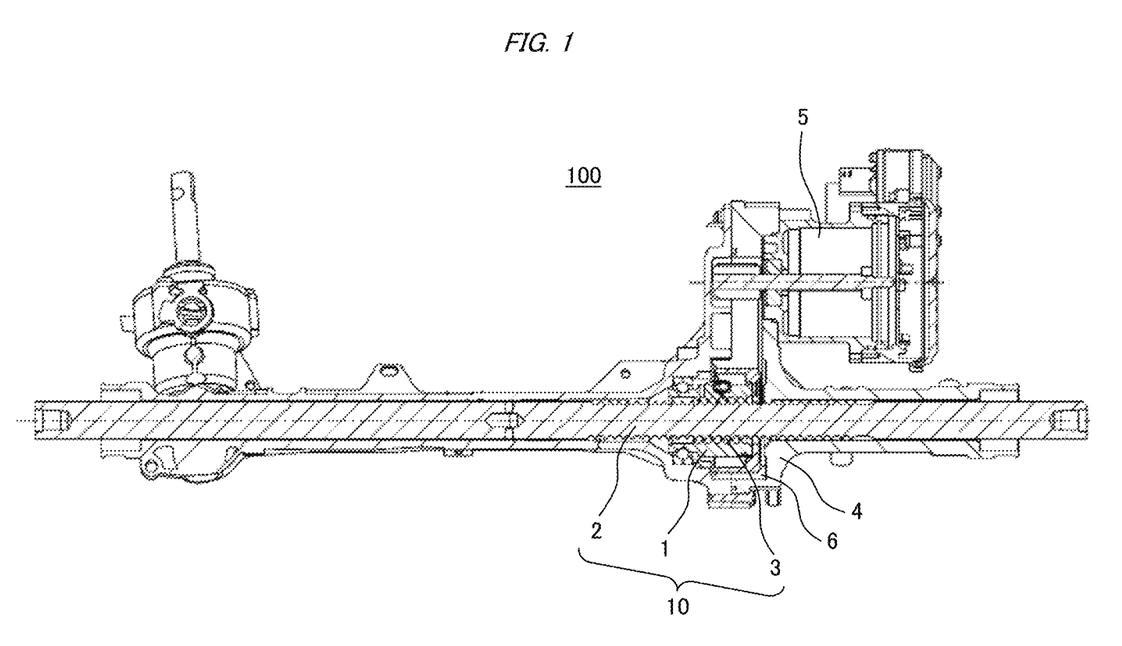
FIG. 1 is a schematic cross-sectional view illustrating an example of a power steering device of the present invention.

FIG. 1 is a schematic cross-sectional view illustrating an example of a power steering device of the present invention. As illustrated in FIG. 1, a power steering device 100 of the present invention is provided with: a ball screw 10 including a nut 1, a screw shaft 2, and a ball 3; and a steering gear case 4 accommodating the ball screw 10; an electric motor 5 used for driving the ball screw 10; and a power transmission mechanism 6 that transmits a rotational driving force of the electric motor 5 to the nut 1.

Figure 2:
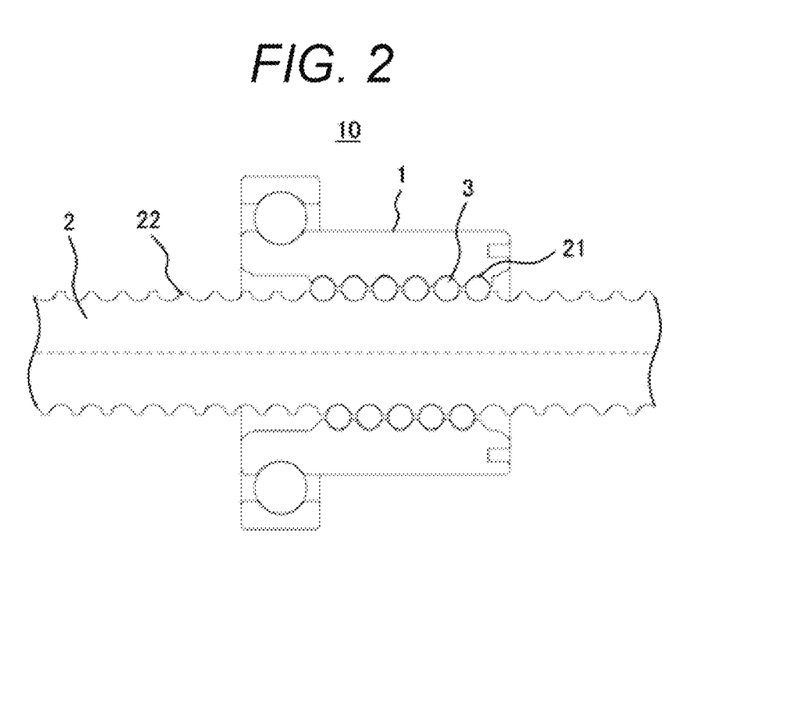
FIG. 2 is an enlarged view of a ball screw of FIG. 1.

FIG. 2 is an enlarged view of the ball screw 10 of FIG. 1. As illustrated in FIG. 2, a female screw 21 is formed on an inner peripheral surface of the nut 1, and a male screw 22 is formed on an outer peripheral surface of the screw shaft 2. The ball 3 is arranged between the female screw 21 and the male screw 22 to come into contact with both the female screw 21 and male screw 22. Substrates of the nut 1 and the screw shaft 2 are made of steel. Specifically, a material of the substrate of the nut 1 is preferably SCM 440, which is an alloy steel material for machine structure of Japanese Industrial Standard (JIS), and JIS S48C, which is a carbon steel material for machine structure, is preferably for the screw shaft 2. Further, each of a surface of the nut 1 in contact with the ball 3 and a surface (a surface or a sliding surface) of the screw shaft 2 in contact with the ball 3 has a carburized layer (hardened layer) formed by a carburization treatment although not illustrated.

Figure 3:
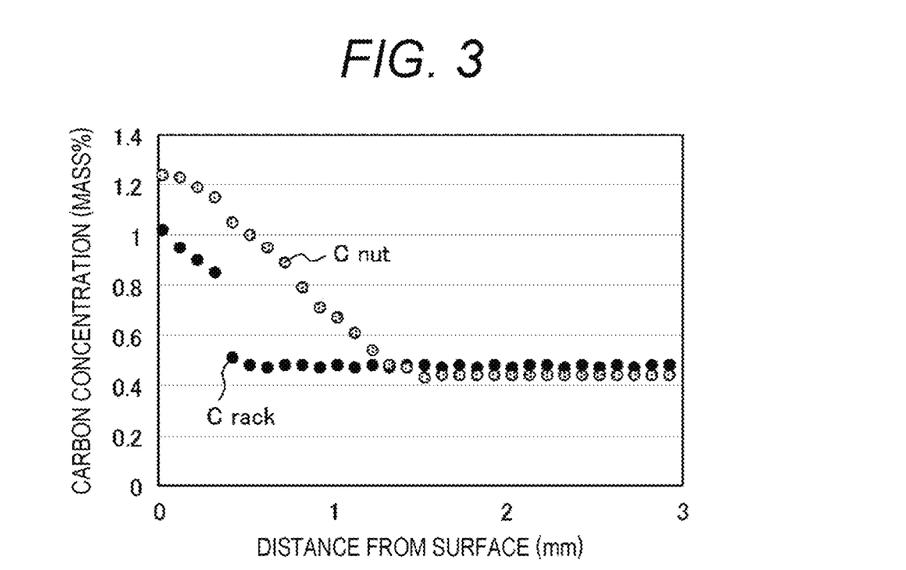
FIG. 3 is a graph illustrating depth-direction distributions of carbon concentrations of a nut and a screw shaft.

FIG. 3 is a graph illustrating depth-direction distributions of carbon concentrations of the nut and the screw shaft. FIG. 3 illustrates a result of analyzing cross sections of the nut 1 and the screw shaft 2 in the depth direction by an electron probe micro analyzer (EPMA). As illustrated in FIG. 3, a carbon concentration Cnut in the carburized layer of the nut 1 is higher than a carbon concentration Crack in the carburized layer of the screw shaft 2 in the ball screw 10 of the present invention. Note that the "carburized layer" in the present specification means a portion where the concentration of carbon is higher than the concentration of a substrate (baseline) according to EPMA analysis. In FIG. 3, a region whose distance is less than 1.5 mm from the surface is recognized as the carburized layer.

Figure 4:
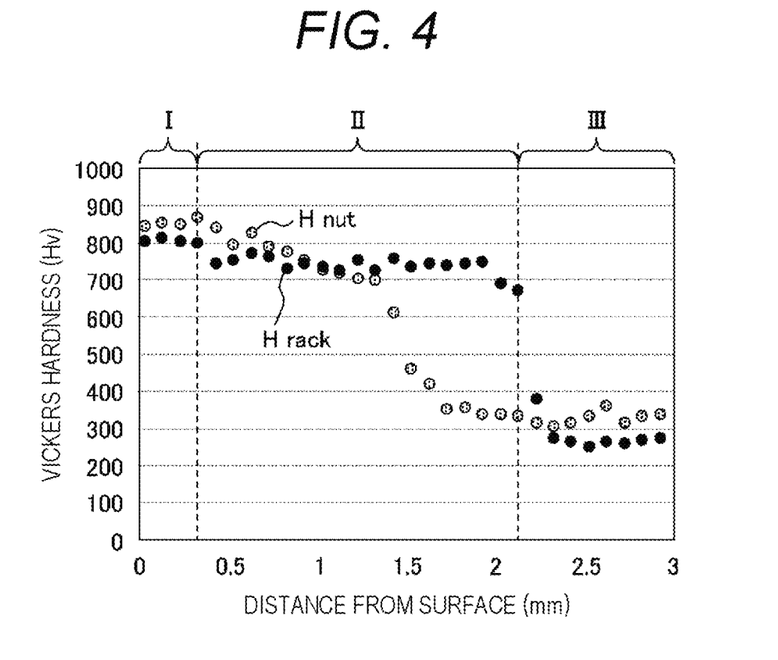
FIG. 4 is a graph illustrating depth distributions of Vickers hardnesses of the nut and the screw shaft.

FIG. 4 is a graph illustrating depth distributions of Vickers hardnesses of the nut 1 and the screw shaft 2. As illustrated in FIG. 4, the nut 1 maintains a high hardness (600 Hv or more) up to a portion deeper than the screw shaft 2. A Vickers hardness Hnut of the nut 1 is larger than a Vickers hardness Hrack of the screw shaft 2 up to a depth at which a distance from the surface is about 2 mm.

Figure 5:
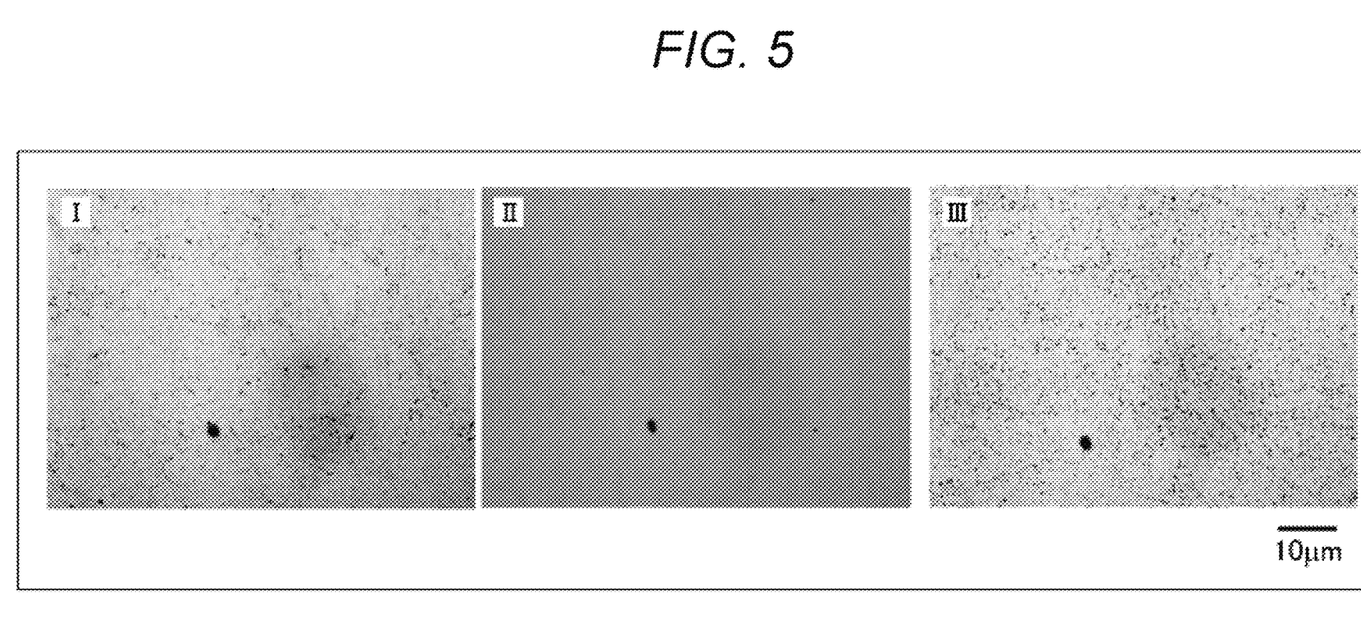
FIG. 5 is a laser micrograph of the screw shaft.

FIG. 5 is a laser micrograph of a surface layer of the screw shaft. Here, the "surface layer" means a layer up to a portion having a depth of about 3 mm from the surface. Photographs I to III of FIG. 5 are photographs of portions corresponding to regions I to III of FIG. 4. The observation was performed by etching the surface of the screw shaft 2 with sodium picrate. From observation photographs of structures obtained by a laser microscope, it has been confirmed that precipitates of carbides (cementite) are dispersed in a matrix having a martensite structure in the region I, the region II has a martensite structure, and the region III has a sorbite structure. That is, the screw shaft has a configuration in which a martensite layer having the cementite precipitates, a martensite layer, and a solvate layer are laminated in this order from the surface.

Figure 6:
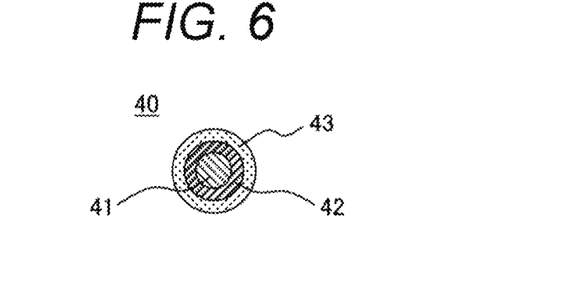
FIG. 6 is a schematic view of a carbide dispersed in a region I in FIG. 5.
Figure 7:
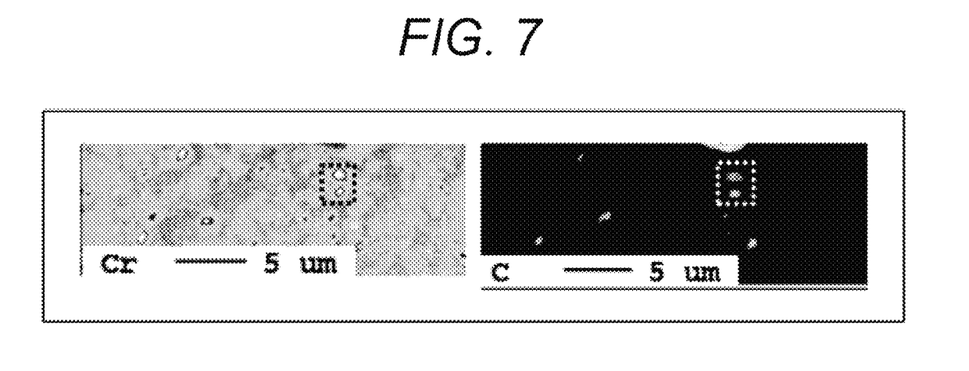
FIG. 7 illustrates a result of elemental analysis by EPMA of the region I in FIG. 5.
Figure 8:
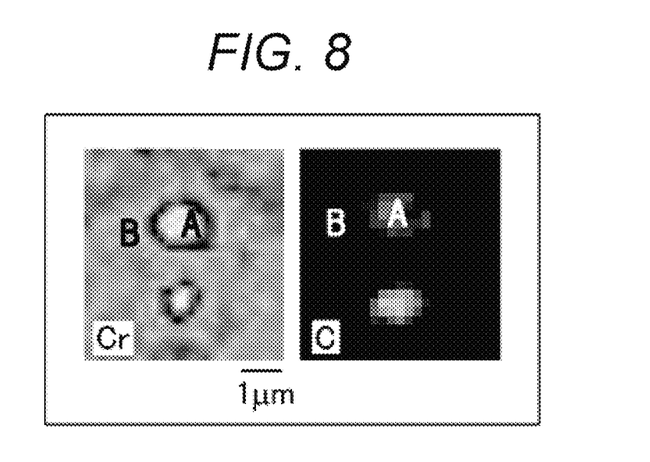
FIG. 8 is an enlarged view of a precipitate in FIG. 6.

FIG. 6 is a schematic view of carbides dispersed in the region I of FIG. 5, FIG. 7 is a result of elemental analysis by EPMA of the region I of FIG. 5, and FIG. 8 is an enlarged view of precipitates (dotted-line portion) of FIG. 6. As illustrated in FIGS. 6 to 8, a carbide precipitate 40 in the region I has: particles 41 having a martensite structure; and two kinds of cementite layers including a first cementite layer A formed on the surface of the particle 41 and a second cementite layer B formed on the surface of the first cementite layer A. Such a structure of the surface of the screw shaft 2 results from performing a carburization treatment on the screw shaft 2 at a radio frequency. The carburization treatment performed with the radio frequency will be described in detail later.

Through the analysis by EPMA, it has been confirmed that the concentration of carbon in the second cementite layer B was lower than the concentration of carbon in the first cementite layer A. Since the carbon concentration on the surface of the particle 41 having the martensite structure is high, the hardness of the screw shaft 2 can be made high.

Figure 9:
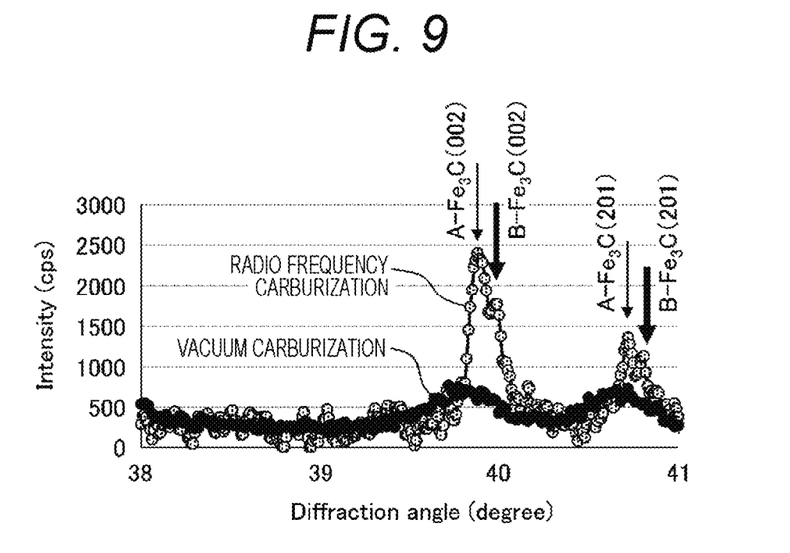
FIG. 9 illustrates X-ray diffraction patterns (θ=38 to 41°) of the screw shaft of the present invention (radio frequency carburization treatment) and a conventional screw shaft (vacuum carburization treatment).
Figure 10:
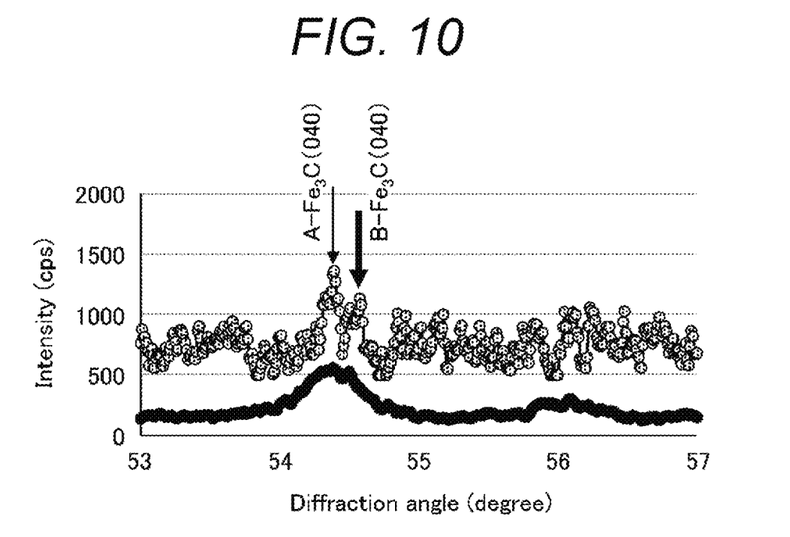
FIG. 10 illustrates X-ray diffraction patterns (θ=53 to 57°) of the screw shaft of the present invention (radio frequency carburization treatment) and the conventional screw shaft (vacuum carburization treatment).

FIGS. 9 and 10 are X-ray diffraction patterns of the screw shaft of the present invention (radio frequency carburization treatment) and a conventional screw shaft (vacuum carburization treatment). The conventional vacuum carburization treatment is a treatment for heating by causing a carburizing gas to flow in a furnace without applying a radio frequency. As illustrated in FIGS. 9 and 10, it can be seen that peaks (a peak of the first cementite layer A: A-Fe3C and a peak of the second cementite layer B: B-Fe3C) of cementite, which are not illustrated in the conventional screw shaft, appear in the screw shaft forming the ball screw of the present invention.

Further, the peak of the second cementite layer B is present on the higher angle side than the peak of the first cementite layer A. This is because the second cementite layer B has a lower carbon concentration and a smaller lattice constant.

[Methods for Manufacturing Ball Screw and Power Steering Device]

Figure 11:
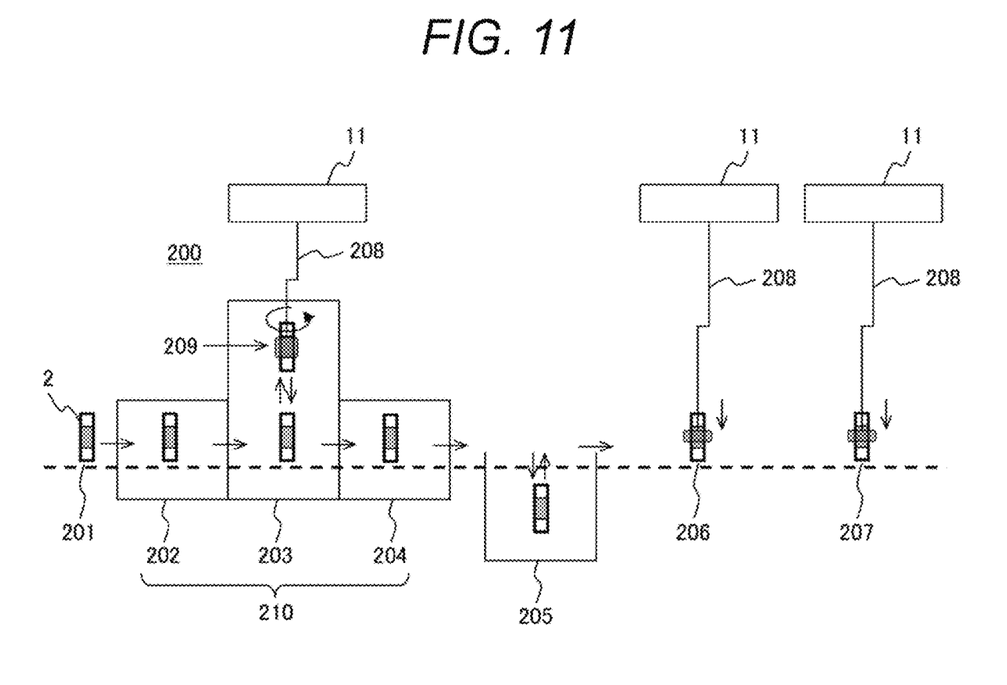
FIG. 11 is a schematic view illustrating an example of a device that performs a heat treatment on the screw shaft.

Next, methods for manufacturing a ball screw and a power steering device according to the present invention will be described. FIG. 11 is a schematic view illustrating an example of a device that performs a heat treatment on the screw shaft. As illustrated in FIG. 11, a heat treatment device 200 includes: a radio frequency carburization treatment unit 210 that performs a carburization treatment on the screw shaft 2 at a radio frequency; a cooling unit 205 that cools the screw shaft 2; a structure adjustment unit 206 that performs structure adjustment of the screw shaft 2; and an induction hardening unit 207 that performs induction hardening of the screw shaft 2. The screw shaft 2 is configured to be capable of moving through the radio frequency carburization treatment unit 210, the cooling unit 205, the structure adjustment unit 206, and the induction hardening unit 207 on a conveyance line 201.

Each of the radio frequency carburization treatment unit 210, the structure adjustment unit 206, and the induction hardening unit 207 includes a radio frequency power supply and a radio frequency coil 208, and the radio frequency coil 208 is wound around the screw shaft 2 to perform radio frequency (for example, 30 kHz) processing. Note that a carburized layer is formed on a part of the screw shaft 2, and thus, FIG. 11 illustrates a configuration in which the radio frequency coil 208 is wound around a part of the screw shaft 2.

The radio frequency carburization treatment unit 210 includes a front chamber 202, a carburization treatment chamber 203, and a rear chamber 204. The front chamber 202 and the rear chamber 204 are chambers evacuated to separate outside air of the radio frequency carburization treatment unit 210 from a carbon atmosphere of the carburization treatment chamber 203. A carburizing gas 209 is supplied to the radio frequency carburization treatment unit 210. As the carburizing gas 209, an acetylene gas ($C_2H_2$) is suitable.

Figure 12:
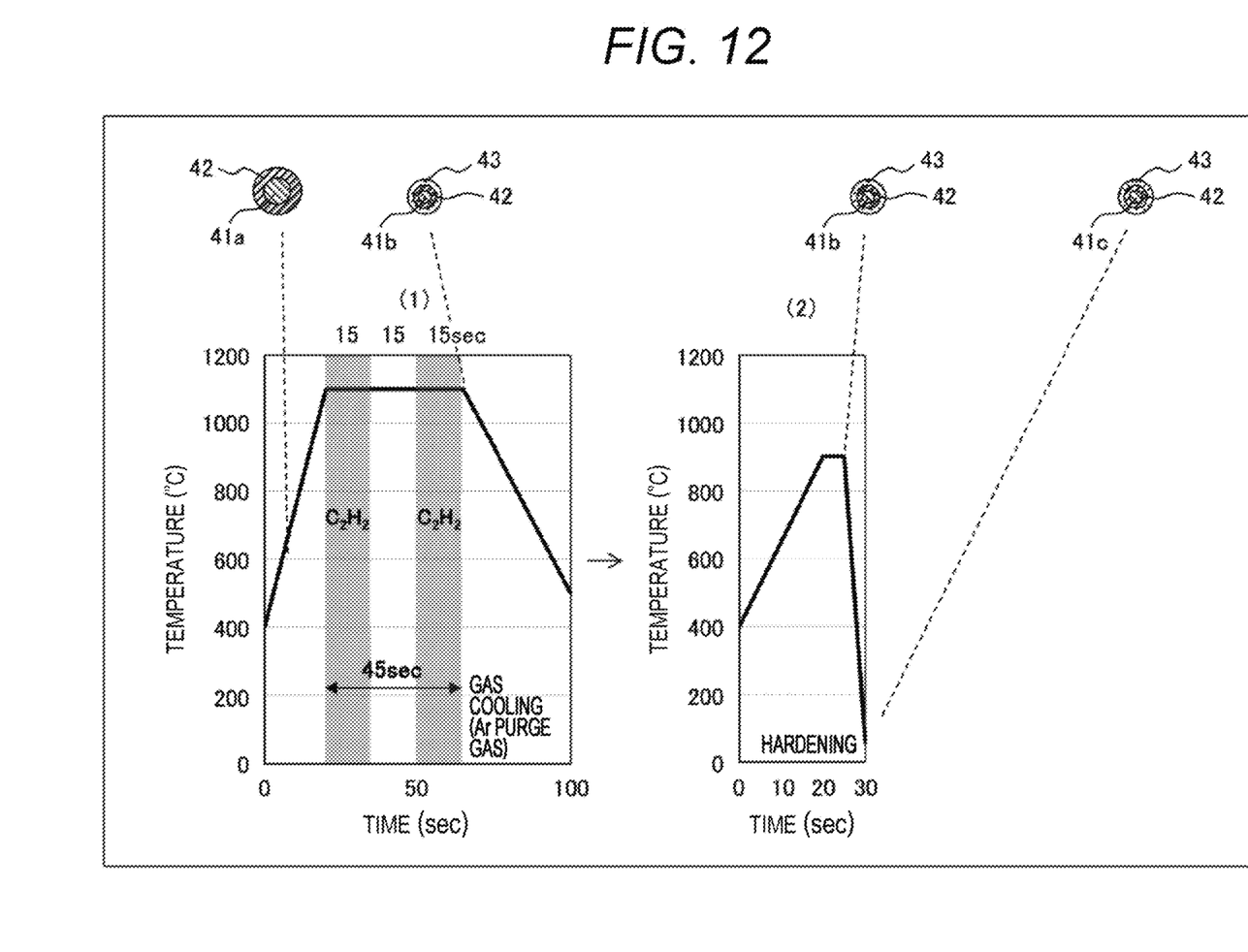
FIG. 12 is a graph illustrating an example of temperature profiles of the radio frequency carburization treatment and induction hardening.

FIG. 12 is a graph illustrating an example of temperature profiles of (1) radio frequency carburization treatment and (2) induction hardening. FIG. 12 also illustrates a schematic view of a carbide precipitate formed on the surface of the screw shaft 2. As illustrated in FIG. 12, in the radio frequency carburization treatment (1), for example, heating is first performed from 400° C. to 1100° C. for 20 seconds. At this time, a carbide having α-Fe (ferrite) 41a and the first cementite layer A formed on the surface of the α-Fe 41a is precipitated on the surface of the steel substrate of the screw shaft. Next, the resultant is held at 1100° C. for 45 seconds, and then, cooled with an Ar gas. While keeping 1100° C., a carburizing gas (acetylene) is introduced for 15 seconds, the introduction of the acetylene gas is stopped for 15 seconds, and the carburizing gas is further introduced for 15 seconds. In this step, the α-Fe (ferrite) 41a becomes γ-Fe (austenite) 41b.

The first cementite layer A starts to disappear at 1100° C., but carbon of the carburizing gas is diffused and supplied, so that the carbon is collected around the first cementite layer A to form the second cementite layer B. As described above, the second cementite layer B is a carbide having a different carbon layer concentration from the first cementite layer A, and has a unit cell volume smaller by 0.1 to 1% than that of the first cementite layer A.

After the radio frequency carburization treatment (1), induction hardening is performed. Heating is performed from 400° C. to 900° C. for 20 seconds, and water quenching is performed after keeping 900° C. for 50 seconds. In this step, γ-Fe (austenite) becomes α'-Fe (martensite).

Although a conventional carburization treatment performs heating at 980° C. for about 3 hours in a carburizing gas, but it is only required to keep 1100° C. for 45 seconds in this radio frequency carburization treatment, and thus, the heating time can be significantly reduced. Further, sufficient strength can be obtained by providing the first cementite layer A and the second cementite layer B as described above.

Figure 13:
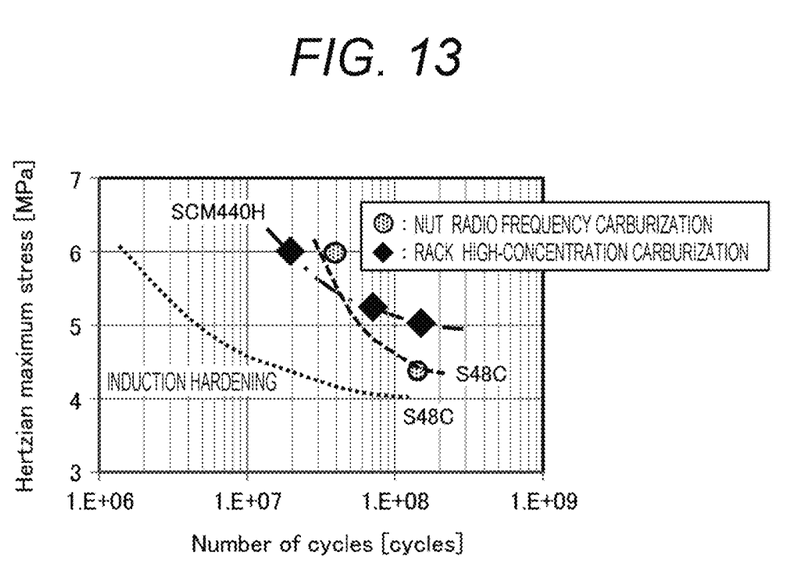
FIG. 13 is a graph illustrating durability of a nut and a rack.

FIG. 13 is a graph illustrating durability of a nut and a rack. FIG. 13 is a graph illustrating results obtained by performing the above-described radio frequency carburization treatment and induction hardening on a male screw of a rack (substrate: S48C), and performing a normal carburization treatment (high-concentration carburization treatment) on a female screw of a nut (substrate: SCM440H). A male screw of a rack (substrate: S48C) subjected to induction hardening is illustrated as a comparison. As can be seen from FIG. 13, the durability of the rack is greatly improved by the radio frequency carburization treatment and the induction hardening as compared with the rack that has not been subjected to the induction hardening. The rack that has been subjected to the radio frequency carburization treatment and the induction hardening exhibits durability equivalent to that of the nut that has been subjected to the normal carburization treatment (high-concentration carburization treatment), and thus, it can be seen that the rack can obtain durability equivalent to that of the nut by short-time processing.

As described above, illustrated is that it is possible to provide the ball screw having the structure in which the screw shaft and the nut satisfy required performance and having improved durability, the method for manufacturing the ball screw, the power steering device, and the method for manufacturing the power steering device according to the present invention.

Note that the present invention is not limited to the above-described embodiment, but includes various modifications. For example, the above-described embodiment has been described in detail in order to describe the present invention in an easily understandable manner, and is not necessarily limited to one including the entire configuration that has been described above. Further, a part of the configuration of a certain embodiment can be replaced with the configuration of another embodiment, and the configuration of another embodiment can be added to the configuration of a certain embodiment. Further, addition, deletion or substitution of other configurations can be made with respect to some configurations of each embodiment.

REFERENCE SIGNS LIST 1 nut
2 screw shaft
3 ball
4 steering gear case
5 electric motor
6 power transmission mechanism
40 precipitate of carbide
41, 41a particle having martensite structure
41b particle having austenite structure
42 first cementite layer A
43 second cementite layer B
11 radio frequency power supply
200 heat treatment device
201 conveyance line
202 front chamber 203 carburization treatment chamber
204 rear chamber
205 cooling unit
206 structure adjustment unit
207 induction hardening unit
208 radio frequency coil
209 carburizing gas
210 radio frequency carburization treatment unit

The invention claimed is:

1. A ball screw comprising:
a nut made of a steel substrate having an inner peripheral surface on which a female screw is formed;
a screw shaft that is combined with the nut and is made of a steel substrate having an outer peripheral surface on which a male screw facing the female screw is formed; and
a plurality of balls arranged between the female screw and the male screw,
wherein a surface of the nut in contact with the ball and a surface of the screw shaft in contact with the ball each have carburized layers, and
a carbon concentration in the carburized layer of the nut is higher than a carbon concentration in the carburized layer of the screw shaft.

2. The ball screw according to claim 1, wherein
the screw shaft includes: a cementite dispersion region in which carbide particles containing cementite are dispersed in a martensite structure on the surface in contact with the ball; a martensite structure formed inside the cementite dispersion region; and a sorbite structure formed inside the martensite structure,
the carbide particle containing the cementite includes a first cementite layer formed on a surface of a particle having a martensite structure and a second cementite layer formed on a surface of the first cementite layer, and
a carbide concentration of the second cementite layer is lower than a carbide concentration of the first cementite layer.

3. The ball screw according to claim 2, wherein a unit cell volume of the second cementite layer is smaller than a unit cell volume of the first cementite layer.

4. The ball screw according to claim 1, wherein a Vickers hardness of a surface of the nut is larger than a Vickers hardness of a surface of the screw shaft.

5. A power steering device comprising:
a ball screw including a nut made of a steel substrate having an inner peripheral surface on which a female screw is formed; a screw shaft that is combined with the nut and is made of a steel substrate having an outer peripheral surface on which a male screw facing the female screw is formed; and a plurality of balls arranged between the female screw and the male screw;
a steering gear case that accommodates the ball screw mechanism;
an electric motor used to drive the ball screw mechanism; and
a power transmission mechanism that transmits a rotational driving force of the electric motor to the nut,
wherein the ball screw is the ball screw according to claim 1.

6. A method for manufacturing a ball screw, which includes: a nut made of a steel substrate having an inner peripheral surface on which a female screw is formed; a screw shaft that is combined with the nut and is made of a steel substrate having an outer peripheral surface on which a male screw facing the female screw is formed; and a plurality of balls arranged between the female screw and the male screw, the method comprising:
performing a radio frequency carburization treatment of heating a surface of the screw shaft in contact with the ball in a carburizing gas atmosphere while applying a radio frequency to form a carburized layer; and
performing an induction hardening treatment of heating the screw shaft subjected to the radio frequency carburization treatment while applying a radio frequency to the screw shaft to quench the screw shaft.

7. The method for manufacturing a ball screw according to claim 6, wherein
a precipitate including a particle having an austenite structure, a first cementite layer formed on a surface of the particle having the austenite structure, and a second cementite layer formed on a surface of the first cementite layer is formed by the radio frequency carburization treatment, and
the induction hardening treatment is performed to change the austenite structure to a martensite structure.

8. The method for manufacturing a ball screw according to claim 6, wherein the radio frequency carburization treatment includes a step of performing heating from 400° C. to 1100° C. for 20 seconds, keeping 1100° C. for 45 seconds while repeating introduction of a carburizing gas and stop of the introduction, and then, performing cooling with an Ar gas.

9. The method for manufacturing a ball screw according to claim 6, wherein the induction hardening treatment includes a step of performing heating from 4400° C. to 900° C. for 20 seconds, keeping 900° C. for 50 seconds, and then, performing quenching.

10. A method for manufacturing a power steering device, which includes:
a ball screw including a nut made of a steel substrate having an inner peripheral surface on which a female screw is formed; a screw shaft that is combined with the nut and is made of a steel substrate having an outer peripheral surface on which a male screw facing the female screw is formed; and a plurality of balls arranged between the female screw and the male screw;
a steering gear case that accommodates the ball screw mechanism;
an electric motor used to drive the ball screw mechanism; and
a power transmission mechanism that transmits a rotational driving force of the electric motor to the nut,
the method comprising
manufacturing the ball screw by the method for manufacturing a ball screw according to claim 6.

* * * * *